United States Patent
Nakashima et al.

(10) Patent No.: US 9,577,465 B2
(45) Date of Patent: Feb. 21, 2017

(54) CONTACTLESS POWER TRANSMISSION DEVICE

(71) Applicant: Kabushiki Kaisha Toyota Jidoshokki, Kariya-shi (JP)

(72) Inventors: Yutaka Nakashima, Kariya (JP); Tsuyoshi Koike, Kariya (JP); Hiroshi Katsunaga, Kariya (JP); Yuichi Taguchi, Kariya (JP); Hiroki Togano, Kariya (JP); Keisuke Matsukura, Kariya (JP); Yuki Tsunekawa, Kariya (JP); Takuma Ono, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 276 days.

(21) Appl. No.: 14/379,975

(22) PCT Filed: Feb. 19, 2013

(86) PCT No.: PCT/JP2013/054010
§ 371 (c)(1),
(2) Date: Aug. 20, 2014

(87) PCT Pub. No.: WO2013/125526
PCT Pub. Date: Aug. 29, 2013

(65) Prior Publication Data
US 2015/0028804 A1    Jan. 29, 2015

(30) Foreign Application Priority Data
Feb. 21, 2012   (JP) .................................. 2012-035226

(51) Int. Cl.
H02J 7/00    (2006.01)
H02J 7/02    (2016.01)
(Continued)

(52) U.S. Cl.
CPC .............. *H02J 7/025* (2013.01); *B60L 11/182* (2013.01); *B60M 7/003* (2013.01); *H01F 38/14* (2013.01);
(Continued)

(58) Field of Classification Search
USPC ......................................... 320/104, 108, 109
See application file for complete search history.

(56) References Cited

U.S. PATENT DOCUMENTS

2008/0122518 A1* 5/2008 Besser .................... H02J 3/382
                                                    327/518
2011/0109263 A1* 5/2011 Sakoda ................. B60L 11/182
                                                    320/108
(Continued)

FOREIGN PATENT DOCUMENTS

EP      2328253 A2    6/2011
JP      2009-106136   5/2009
(Continued)

OTHER PUBLICATIONS

English translation of International Patent Application No. PCT/JP2013/054010: International Preliminary Report on Patentability dated Aug. 26, 2014, 5 pages.
(Continued)

*Primary Examiner* — Brian Ngo
(74) *Attorney, Agent, or Firm* — Baker & Hostetler LLP

(57) ABSTRACT

A contactless power transmission device includes a switching unit that switches a power transmission line so that a first power is transmitted through the first line when an AC power supply outputs a first AC power and so that a second power is transmitted through a second line when the AC power supply outputs a second AC power. An impedance conversion unit is arranged on the second line that converts an impedance from an output of the AC power supply to a
(Continued)

variable load when the second power is transmitted through the second line to approach an impedance from the output of the AC power supply to the variable load when the first power is transmitted through the first line.

7 Claims, 2 Drawing Sheets

(51) Int. Cl.
- *B60M 7/00* (2006.01)
- *H02J 17/00* (2006.01)
- *B60L 11/18* (2006.01)
- *H01F 38/14* (2006.01)
- *H02J 5/00* (2016.01)
- *B60L 5/00* (2006.01)
- *H01M 10/44* (2006.01)

(52) U.S. Cl.
CPC ............... *H02J 5/005* (2013.01); *H02J 17/00* (2013.01); *H02J 50/10* (2016.02); *B60L 5/005* (2013.01); *H01M 10/44* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2011/0140542 A1* | 6/2011 | Kim | H02J 5/005 307/104 |
| 2011/0266882 A1 | 11/2011 | Yamamoto et al. | |
| 2015/0171820 A1* | 6/2015 | Koike | H02J 5/005 320/109 |

FOREIGN PATENT DOCUMENTS

| | | |
|---|---|---|
| JP | 2011-120443 | 6/2011 |
| JP | 2012-138976 | 7/2012 |
| WO | WO 2011/138860 A1 | 11/2011 |
| WO | WO 2012/169014 A1 | 12/2012 |
| WO | WO 2013/125526 A1 | 8/2013 |

OTHER PUBLICATIONS

European Patent Application No. 13751234.9: Extended European Search Report dated Oct. 30, 2015, 4 pages.

Japanese Patent Application No. 2012-035226: Notification of Reasons for Refusal dated Sep. 4, 2015, 2 pages, Machine Translation included.

\* cited by examiner

CONTACTLESS POWER TRANSMISSION DEVICE

CROSS-REFERENCE TO RELATED APPLICATIONS

This application is the National Stage of International Application No. PCT/JP2013/054010, filed Feb. 19, 2013, which claims the benefit of Japanese Application No. 2012-035226, filed Feb. 21, 2012, the disclosures of which are incorporated herein by reference in their entireties.

TECHNICAL FIELD

The present disclosure relates to a contactless power transmission device.

BACKGROUND ART

A contactless power transmission device that uses a magnetic field resonance has been known as a common technique for a contactless power transmission device, which does not use a power supply wire, a power transmission cable or the like. For example, a contactless power transmission device described in Japanese Laid-open Patent Publication No. 2009-106136 includes a power supplying device that includes an AC power supply and a primary resonance coil, which receives an AC power from the AC power supply. The contactless power transmission device includes a secondary resonance coil arranged on a vehicle that enables the magnetic field resonance with the primary resonance coil. When the magnetic field resonance occurs between the primary resonance coil and the secondary resonance coil, the AC power is supplied from the power supplying device to the vehicle. The AC power is used for charging a vehicle battery, namely a variable load, arranged on the vehicle.

PRIOR ART DOCUMENT

Patent Document

Patent Document 1: Japanese Laid-Open Patent Publication No. 2009-106136

SUMMARY OF THE INVENTION

It may be desirable to transmit AC power having different magnitudes according to the situation. In this case, since the impedance from an output end of the AC power supply to the vehicle battery varies due to the variation in the magnitude of the AC power to be transmitted, a mismatch may occur in the impedance. The present disclosure solves this problem.

It is an objective of the present disclosure to provide a contactless power transmission device that enables the transmission of the AC power having different magnitudes in a preferable manner and improves the transmission efficiency According to one aspect of the present disclosure, a contactless power transmission device includes: an AC power supply that outputs an AC power; a primary coil to which the AC power is inputted; a secondary coil that receives the AC power from the primary coil in a contactless manner; and a variable load that varies an impedance in accordance with an inputted power. The AC power supply is configured to output a first AC power and a second AC power that differs in magnitude to each other as the AC power. A power transmission line between the AC power supply and the variable load includes a first line and a second line different from the first line. The contactless power transmission device further includes: a switching unit that switches the power transmission line so that a first power is transmitted through the first line when the AC power supply outputs the first AC power and so that a second power is transmitted through the second line when the AC power supply outputs the second AC power; and an impedance conversion unit arranged on the second line that converts an impedance from an output of the AC power supply to the variable load when the second power is transmitted through the second line to approach an impedance from the output of the AC power supply to the variable load when the first power is transmitted through the first line.

This aspect suppresses the impedance from the output of the AC power supply to the variable load from being varied between when the first power is transmitted and when the second power is transmitted. This suppresses the variation in the impedance due to the transmissions of the different powers, and thus suppresses the occurrence of the mismatch in the impedance.

The first power is transmitted to the variable load without passing through the impedance conversion unit. Accordingly, when the impedance in the power transmission system is previously set to match with the first power, the mismatch in the impedance is suppressed and the power loss generated by the impedance conversion unit is prevented when the first power is transmitted. Accordingly, this suppresses the power loss when the first power is transmitted, and thus the transmission efficiency is improved.

On the contrary, it is assumed that a converter that converts the impedance in accordance with the transmitted power is arranged on the power transmission line to achieve constant impedance regardless of the transmitted power. However, in such a case where a converter is arranged, the power loss is generated via this converter so as to lower the transmission efficiency.

The above-discussed circumstance is not limited to the apparatus that transmits power in a contactless manner by the magnetic field resonance, but common to the apparatus that transmits power with a contactless manner by the electromagnetic inductance.

"First power" is a power that corresponds to the first AC power. "Second power" is a power that corresponds to the second AC power. For example, when a rectifying unit that rectifies the AC power to DC power is arranged between the secondary coil and the variable load, "the first power" is the first AC power or a first DC power obtained by rectifying the first AC power. In this case, "the second power" is the second AC power or a second DC power obtained by rectifying the second AC power.

In a preferable manner, the impedance conversion unit includes a switching element, and the impedance conversion unit adjusts at least one of a duty ratio and a cycle of a switching operation of the switching element to convert the impedance. According to this manner, the impedance is converted by the switching operation of the switching element. Accordingly, the impedance conversion is achieved with a relatively easy manner.

In particular, it is assumed that the configuration includes a capacitor or the like to convert the impedance. However, when the capacitor or the like as discussed above is arranged, it is a concern that the mounted area be increased. In addition, for a specific impedance or capacitance, the above capacitor is not preferable for a realistic use or be costly. On the contrary, according to the present disclosure, the impedance is converted by the switching operation of the switching element having a relatively simple structure. This prevents the drawbacks discussed above.

In a preferable manner, the secondary coil and the variable load are mounted on a vehicle, the contactless power transmission device further includes a rectifying unit that rectifies the AC power received by the secondary coil to a DC power, the variable load is a vehicle battery that is charged by receiving the DC power rectified by the rectifying unit. According to this manner, the AC power received by the secondary coil is used to charge the vehicle battery.

The vehicle battery requires a stored amount of electricity that is greater than that in a cellar phone battery. It is assumed that the vehicle battery including a plurality of battery cells connected in series to each other increase the amount of stored electricity. In this configuration, when charging the vehicle battery, a relatively large amount of power is supplied to the vehicle battery at an early stage, and subsequently, a relatively small amount of power is supplied to the vehicle battery to compensate the variation in the stored amount of the electricity in the plurality of battery cells.

It is assumed that a plurality of vehicle batteries are charged by one AC power supply. In this case, since the maximum power of the AC power supply has an upper limit, the power supplied to each vehicle battery may need to be decreased. Accordingly, it may be necessary to transmit different powers.

According to the present disclosure, the power is transmitted in a preferable manner even when the different powers need to be transmitted when charging the vehicle battery. Accordingly, the vehicle battery is charged in a preferable manner. The power having high frequency in use, or the power supplied for a long time, is defined as the first AC power. This shortens the time for charging the vehicle battery.

In a preferable manner, the first power is a power that corresponds to a maximum power capable of being supplied to the vehicle battery. This manner improves the transmission efficiency when the vehicle battery is charged by the first power so that the time for charging the vehicle battery is shortened.

In a preferable manner, satisfying at least one of conditions as follows: a frequency of use of the first power is higher than a frequency of use of the second power; and a time period during which the first power is supplied is relatively longer than a time period during which the second power is supplied. This manner improves the transmission efficiency when the vehicle battery is charged by the first power so that the time for charging the vehicle battery is shortened.

In a preferable manner, the impedance conversion unit is arranged between the secondary coil and the variable load in the second line.

In a preferable manner, the contactless power transmission device further includes a rectifying unit that rectifies the AC power received by the secondary coil to a DC power, the impedance conversion unit is a DC/DC converter that converts the DC power rectified by the rectifying unit by the switching operation. These manners suppress the impedance from the output of the AC power supply to the variable load from being varied between when the first power is transmitted and when the second power is transmitted. This prevents the impedance from being varied due to the transmission of the different powers, thereby suppressing the occurrence of the mismatch in the impedance.

Other aspects and advantages of the disclosure will become apparent from the following description, taken in conjunction with the accompanying drawings, illustrating by way of example the principles of the disclosure.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Hereinafter, discussion will be made on a first embodiment of a contactless power transmission device or a contactless power transmission system according to the present disclosure.

Figure 1:
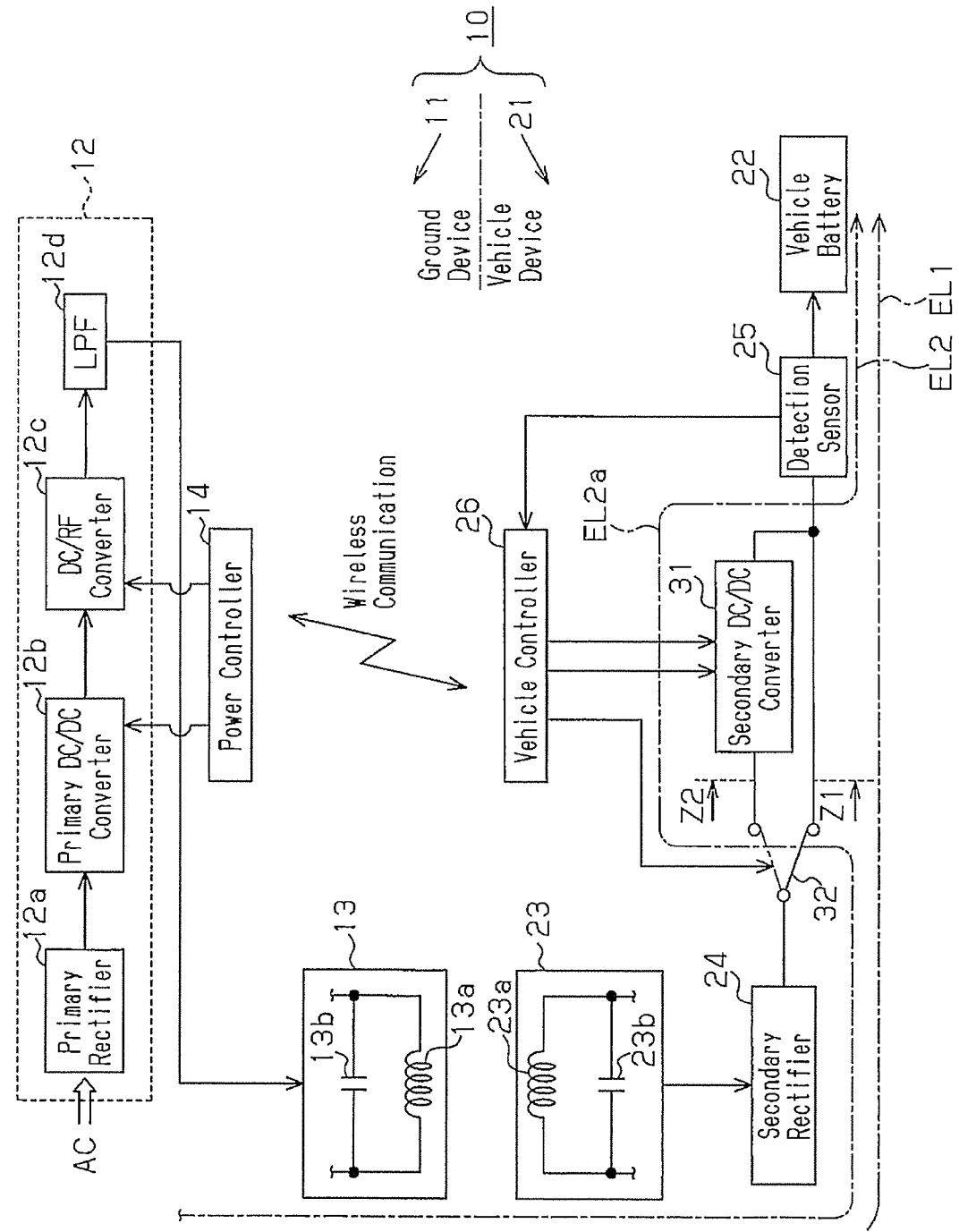
FIG. 1 is a block diagram showing an electrical configuration of a contactless power transmission device according to the present disclosure.

As shown in FIG. 1, a contactless power transmission device 10 includes a ground device 11 and a vehicle device 21 mounted on a vehicle. The ground device 11 serves as a primary device, namely a power supplying device. The vehicle device 21 serves as a secondary device, namely a power receiving device.

The ground device 11 includes a high-frequency power supply 12, which is capable of outputting a high-frequency power, namely an AC power, having a certain frequency. The high-frequency power supply 12 is configured to use a system power and output the high-frequency power having a sine wave, and is configured so that an internal resistance is capable of being ignored, namely the internal resistance becomes 0Ω. Specifically, the high-frequency power supply 12 includes a primary rectifier 12$a$ that rectifies the system power to a DC power, and a primary DC/DC converter 12$b$ that converts the DC power. The high-frequency power supply 12 includes a DC/RF converter 12$c$ including a class D amplifier and a low-pass filter 12$d$. The DC/RF converter 12$c$ uses the DC power, which is converted by the primary DC/DC converter 12$b$, and generates the high-frequency power having a rectangular wave. The low-pass filter 12$d$ shapes the high-frequency power having the rectangular wave outputted from the DC/RF converter 12$c$ to the high-frequency power having the sine wave. Each of the primary DC/DC converter 12$b$ and the DC/RF converter 12$c$, namely the class D amplifier, includes a switching element such as a power MOSFET or an IGBT. Each of the primary DC/DC converter 12$b$ and the DC/RF converter 12$c$ operates with a switching operation of the switching element. In other words, high-frequency power supply 12 is a switching power supply that obtains the high-frequency power having the certain frequency with the switching operation of the switching element. The high-frequency power supply 12 has a power efficiency of approximately 100%.

Specific configurations are not limited to the high-frequency power supply 12 as discussed above. For example, in the high-frequency power supply 12, the DC/RF converter 12$c$ may include a class E amplifier. Hereinafter, the high-frequency power means the high-frequency power having a sine wave.

The high-frequency power outputted from the high-frequency power supply 12 is transmitted to the vehicle device 21 in a contactless manner and used to charge a vehicle battery 22, which serves as an on-vehicle electrical storage device arranged in the vehicle device. Specifically, the contactless power transmission device 10 includes a power transmitter 13 arranged in the ground device 11 and a power receiver 23 arranged in the vehicle device 21 to transmit the power between the ground device 11 and the vehicle device 21. The high-frequency power is inputted to the power transmitter 13

Each of the power transmitter 13 and the power receiver 23 is capable of the magnetic field resonance. Specifically, the power transmitter 13 is a resonance circuit including a primary coil 13a and a primary capacitor 13b that are connected to each other in parallel. The power receiver 23 is a resonance circuit including a secondary coil 23a and a secondary capacitor 23b that are connected to each other in parallel. Resonant frequencies in the power transmitter 13 and in the power receiver 23 are set to be the same to each other.

According to the above configuration, when the high-frequency power is inputted from the high-frequency power supply 12 to the power transmitter 13, namely the primary coil 13a, the magnetic field resonance occurs between the power transmitter 13, namely the primary coil 13a and the power receiver 23, namely the secondary coil 23a. According to this, the power receiver 23 receives a part of energy in the power transmitter 13. That is, the power receiver 23 receives the high-frequency power from the power transmitter 13.

The vehicle device 21 includes a secondary rectifier 24 serving as a rectifier that rectifies the high-frequency power received by the power receiver 23 to the DC power. The DC power rectified by the secondary rectifier 24 is inputted to the vehicle battery 22.

The vehicle battery 22 includes a plurality of battery cells connected to each other in series. The vehicle battery 22 serves as a variable load that allows the impedance thereof to be varied in accordance with the inputted DC power.

A detection sensor 25, which detects an amount of electricity stored in the vehicle battery, is arranged between the secondary rectifier 24 and the vehicle battery 22. The detection results from the detection sensor 25 is inputted to a vehicle controller 26 arranged in the vehicle device 21. Accordingly, the vehicle controller 26 is capable of obtaining the amount of the electricity stored in the vehicle battery 22.

The ground device 11 includes a power controller 14, which is capable of a wireless communication with the vehicle controller 26. The power controller 14 controls the high-frequency power supply 12, namely the primary DC/DC converter 12b and the DC/RF converter 12c, through a communication with the vehicle controller 26.

Specifically, the power controller 14 performs on-off control of the high-frequency power from the high-frequency power supply 12. The power controller 14 also controls the duty ratio of the switching operation in the switching element in the primary DC/DC converter 12b in the high-frequency power supply 12. The duty ratio defines the magnitude of a DC voltage outputted from the primary DC/DC converter 12b. According to this, the power controller 14 is capable of changing the magnitude of the high-frequency voltage outputted from the high-frequency power supply 12. Accordingly, the magnitude of the high-frequency power outputted from the high-frequency power supply 12 is changeable.

An output end of the power receiver 23 is connected to an input end of the secondary rectifier 24, which serves as a certain device. Accordingly, the impedance from the output end of the power receiver 23 to the vehicle battery 22 is also referred to as an input impedance from the secondary rectifier 24, namely, the input end of the secondary rectifier 24 to the vehicle battery 22.

Subsequently, discussion will be made on a power transmission line between the high-frequency power supply 12 and the vehicle battery 22.

The contactless power transmission device 10 includes a first line EL1 and a second line EL2, which serve as a power transmission line between the high-frequency power supply 12 and the vehicle battery 22. The first line EL1 and the second line EL2 are common to each other without a portion between the secondary rectifier 24 and the vehicle battery 22, more specifically, without a portion between the secondary rectifier 24 and the detection sensor 25. Concretely, a portion between the high-frequency power supply 12 and the secondary rectifier 24 and a portion between the detection sensor 25 and the vehicle battery 22 are common line. A secondary DC/DC converter 31 serving as an impedance conversion unit is arranged on an individual line EL2a, which is a part of the second line EL2 not common with the first line EL1.

The vehicle device 21 includes a relay 32 serving as a switching unit that switches the power transmission line between the first line EL1 and the second line EL2. The relay 32 is arranged between the secondary rectifier 24 and the secondary DC/DC converter 31.

As discussed above, the high-frequency power supply 12 is capable of outputting the high-frequency powers having different magnitudes. Specifically, the high-frequency power supply 12 is capable of outputting a first high-frequency power and a second high-frequency power that are relatively large or small to each other, namely that have magnitude different to each other. The first high-frequency power is a maximum power capable of being supplied to the vehicle battery 22. The first high-frequency power is determined from a permissible amount of power to be inputted to the vehicle battery 22, a maximum voltage to be outputted from the high-frequency power supply 12 or the like.

The DC power rectified by the secondary rectifier 24 when the high-frequency power supply 12 outputs the first high-frequency power is referred to as a first DC power. The DC power rectified by the secondary rectifier 24 when the high-frequency power supply 12 outputs the second high-frequency power is referred to as a second DC power.

In addition, the first high-frequency power or the first DC power, which is transmitted between the high-frequency power supply 12 and the vehicle battery 22 is referred to as a first power. In addition, the second high-frequency power or the second DC power, which is transmitted between the high-frequency power supply 12 and the vehicle battery 22 is referred to as a second power. In other words, the first power is a power transmitted between the high-frequency power supply 12 and the vehicle battery 22 when the high-frequency power supply 12 outputs the first high-frequency power. The second power is a power transmitted between the high-frequency power supply 12 and the vehicle battery 22 when the high-frequency power supply 12 outputs the second high-frequency power.

The vehicle controller 26 controls a relay 32 in accordance with the high-frequency power outputted from the high-frequency power supply 12. Specifically, when the first high-frequency power is outputted from the high-frequency power supply 12, the vehicle controller 26 switches the relay 32 so that the first power is transmitted through the first line EL1. When the second high-frequency power is outputted from the high-frequency power supply 12, the vehicle controller 26 switches the relay 32 so that the second power is transmitted through the second line EL2. That is, the first power, namely the first DC power is transmitted to the vehicle battery 22 without passing through the secondary DC/DC converter 31. The second power, namely the second DC power is transmitted to the vehicle battery 22 through the secondary DC/DC converter 31.

Hereinafter, when the first power is transmitted through the first line EL1, the impedance from a contacting point of the relay 32, namely a connection object of the secondary rectifier 24, to the vehicle battery 22 is referred to as a first impedance Z1. When the second power is transmitted through the second line EL2, the impedance from a contacting point of the relay 32 to the vehicle battery 22 is referred to as a second impedance Z2.

The impedance in each of the electronic components on the power transmission line is set to correspond to the first impedance Z1. For example, an output impedance of the power receiver 23 is set to correspond to the first impedance Z1 to prevent the mismatch in the impedance when the first power is transmitted through the first line EL1.

Figure 2:
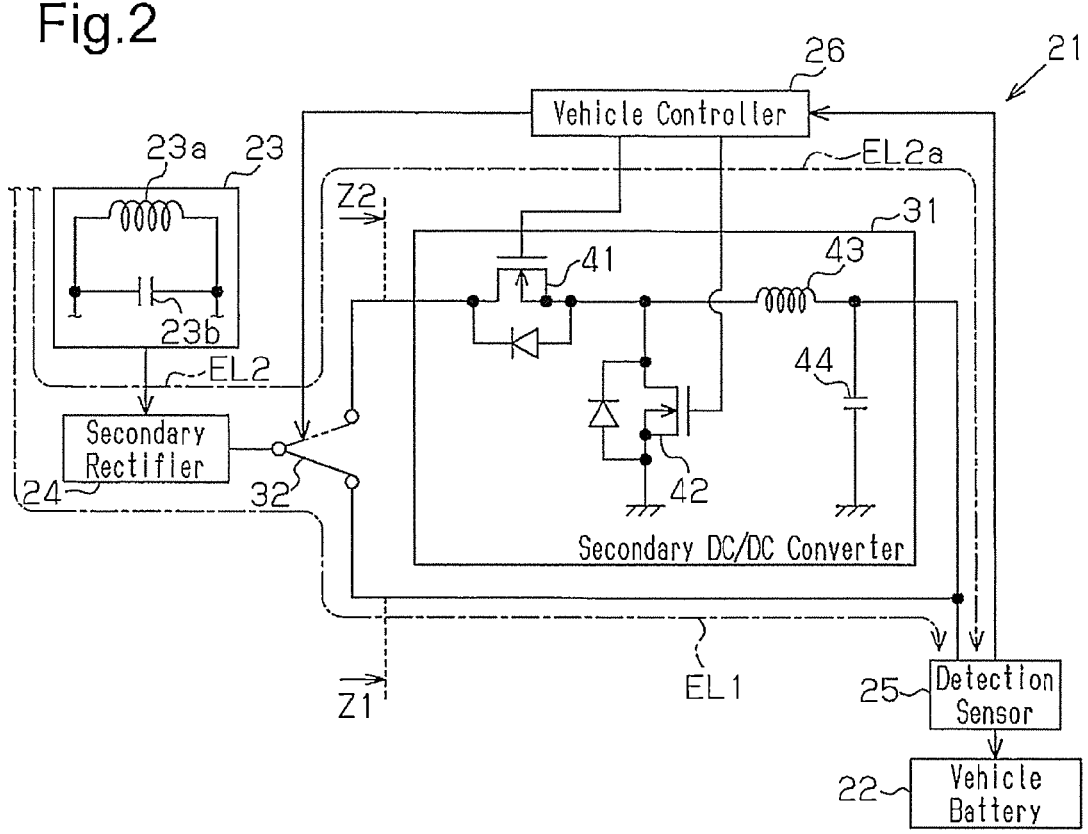
FIG. 2 is a circuit diagram of a secondary DC/DC converter shown in FIG. 1.

Subsequently, discussion will be made on the specific configuration of the secondary DC/DC converter 31. As shown in FIG. 2, the secondary DC/DC converter 31 converts the DC voltage outputted from the secondary rectifier 24 to the DC voltage having a different magnitude, and outputs the converted DC voltage to the vehicle battery 22. The secondary DC/DC converter 31 includes two switching elements, namely a first switching element 41 and a second switching element 42, a coil 43 and a capacitor 44. Each of the first switching element 41 and the second switching element 42 is comprised of an n-type power MOSFET. However, each of the first switching element 41 and the second switching element 42 is not limited to the n-type power MOSFET, but may be comprised of IGBT or the like.

A drain of the first switching element 41 is connected with an input terminal of the secondary DC/DC converter 31, namely an output terminal of the secondary rectifier 24. A source of the first switching element 41 is connected with a first end of the coil 43 and with a drain of the second switching element 42. A source of the second switching element 42 is grounded. A second end of the coil 43 is connected with an output terminal of the secondary DC/DC converter 31, and therefore connected with the vehicle battery 22 through the detection sensor 25. A first end of the capacitor 44 is connected with the second end of the coil 43, and a second end of the capacitor 44 is grounded.

A gate of the first switching element 41 and a gate of the second switching element 42 are connected with the vehicle controller 26. The vehicle controller 26 controls a gate voltage of the first switching element 41 and a gate voltage of the second switching element 42 so as to alternately activate the first switching element 41 and the second switching element 42.

According to this configuration, when a switching operation such as an on-off operation and a chopping is periodically performed to alternately activate the first switching element 41 and the second switching element 42, the DC voltage according to the duty ratio of the switching operation between the first switching element 41 and the second switching element 42 is outputted from the output terminal of the secondary DC/DC converter 31. In other words, the DC voltage according to a pulse width of a pulse wave generated by the periodical switching operation between the first switching element 41 and the second switching element 42 is outputted from the output terminal of the secondary DC/DC converter 31. In this case, since the DC power inputted to the vehicle battery 22 is constant, the impedance from the input terminal of the secondary DC/DC converter 31 to the vehicle battery 22 varies when the DC voltage varies. Accordingly, the impedance from the input terminal of the secondary DC/DC converter 31 to the vehicle battery 22 varies in accordance with the DC voltage, namely the duty ratio.

The duty ratio is set to prevent the impedance from the output terminal of the power receiver 23 to the vehicle battery 22 from being varied between when the first power is transmitted through the first line EL1 and when the second power is transmitted through the second line EL2. Specifically, the duty ratio is set to approach the second impedance Z2 to the first impedance Z1. More specifically, the duty ratio is set to conform the second impedance Z2 to the first impedance Z1.

Subsequently, discussion will be made on a control for charging performed by the power controller 14 and the vehicle controller 26.

As shown in FIG. 1, the vehicle is arranged on a chargeable position, specifically, arranged on a position in which the magnetic field resonance can occur between the power transmitter 13, namely the primary coil 13a and the power receiver 23, namely the secondary coil 23a. At this time, the vehicle controller 26 obtains the amount of the electricity stored in the vehicle battery in an actual state and performs the control in accordance with the amount of the electricity.

Specifically, the vehicle controller 26 determines whether the amount of the electricity in the actual state is more than a threshold amount of the electricity, which has been determined preliminarily. When the amount of the electricity in the actual state is less than the threshold amount of the electricity, the vehicle controller 26 send to the power controller 14 a first request signal for requesting the first high-frequency power, and controls relay 32 to switch the power transmission line to the first line EL1. When the amount of the electricity in the actual state is more than the threshold amount of the electricity, the vehicle controller 26 send to the power controller 14 a second request signal for requesting the second high-frequency power, and controls relay 32 to switch the power transmission line to the second line EL2.

When receiving the request signals, the power controller 14 controls the high-frequency power supply 12, namely the primary DC/DC converter 12b, to output the high-frequency power in accordance with the request signals. The charging of the vehicle battery 22 is thus started.

The vehicle controller 26 periodically obtains the amount of the electricity in the vehicle battery 22 during the charging. When the amount of the electricity in the vehicle battery 22 becomes more than the threshold amount of the electricity, the vehicle controller 26 send to the power controller 14 the second request signal and controls relay 32 to switch the power transmission line from the first line EL1 to the second line EL2. The power controller 14 switches the high-frequency power outputted from the high-frequency power supply 12 from the first high-frequency power to the second high-frequency power.

When the second power is outputted through the second line EL2, the vehicle controller 26 controls the secondary DC/DC converter 31 to alternately activate the first switching element 41 and the second switching element 42 as shown in FIG. 2.

When the charging of the vehicle battery 22 is completed or terminated, the vehicle controller 26 send to the power controller a stop request signal. When receiving the stop request signal, the power controller 14 stops to output the high-frequency power. Accordingly, the charging of the vehicle battery 22 is terminated.

The threshold amount of the electricity stored in the vehicle battery 22 is set close to the maximum amount of the electricity in the vehicle battery 22. Specifically, the threshold amount of the electricity stored in the vehicle battery 22 is approximate 80% relative to the maximum amount of the electricity in the vehicle battery 22. Accordingly, when the charging of the vehicle battery 22 starts in a state in which the amount of the electricity in the vehicle battery 22 is close to "0," the first power is transmitted for a longer time than the second power is transmitted. That is, the first power is inputted to the vehicle battery 22 for a longer time than the second power is inputted to the vehicle battery 22.

Hereinafter, discussion will be made on the operation of the contactless power transmission device 10.

When the amount of the electricity in the vehicle battery 22 is less than the threshold amount of the electricity, the first DC power, which is relatively large, is inputted to the vehicle battery 22. Accordingly, the vehicle battery 22 is charged within a relatively short time period.

When the amount of the electricity in the vehicle battery 22 is more than the threshold amount of the electricity, the second DC power, which is relatively small, is inputted to the vehicle battery 22. This type of charging is referred to as a push-in charging. Accordingly, the vehicle battery 22 is charged so as to compensate variations in the battery cells in the vehicle battery 22.

The first power is transmitted through the first line EL1 on which the secondary DC/DC converter 31 is not intervened. The second power is transmitted through the second line EL2 on which the secondary DC/DC converter 31 is intervened. Accordingly, the first power is inputted to the vehicle battery 22 while preventing a power loss by the secondary DC/DC converter 31.

The secondary DC/DC converter 31 arranged on the second line EL2 conforms the second impedance Z2 to the first impedance Z1. Accordingly, even when the transmitted power varies, the impedance as viewed from the power receiver 23 to the vehicle battery 22, specifically the impedance from the output terminal of the power receiver 23 to the vehicle battery 22, is the same both on the first line EL1 and on the second line EL2. Accordingly, a mismatch in the impedance is not likely to be occurred even when the second power is transmitted in the configuration including various electronic components in which each of impedances in various electronic components is set to correspond to the first impedance Z1.

The first embodiment discussed above specifically has advantageous effects discussed below.

(1) The power transmission line between the power receiver 23 and the vehicle battery 22 includes the first line EL1 and the second line EL2. The power transmission line is configured so that the first power is transmitted through the first line EL1 and the second power is transmitted through the second line EL2 by controlling the relay 32. The secondary DC/DC converter 31 for approaching the second impedance Z2 to the first impedance Z1 is arranged on the second line EL2. Accordingly, when the high-frequency power supply 12 outputs the high-frequency power that has a different magnitude, the impedance from the output terminal of the power receiver 23, or the input terminal of the secondary rectifier 24, to the vehicle battery 22 is not likely to be varied. Accordingly, the mismatch in the impedance is not likely to be occurred when the second power is transmitted in the configuration including the various electronic components in which each of the impedances in the various electronic components is set to correspond to the first impedance Z1. Accordingly, in the first embodiment, the powers having different magnitudes are capable of being transmitted in a preferable manner.

Contrary, when the first power is transmitted, the first line EL1 is used so that the first power is transmitted without through the secondary DC/DC converter 31. Accordingly, the transmission efficiency increases with an amount corresponding to the power loss in the secondary DC/DC converter 31.

In particular, the impedance in the vehicle battery 22 varies in accordance with the inputted DC power. Regarding this impedance variation, in the contactless power transmission device 10 according to the first embodiment, the secondary DC/DC converter 31 that converts the impedance is arranged on the vehicle device 21 on which the vehicle battery 22 is mounted, specifically, between the power receiver 23 and the vehicle battery 22 on the second line EL2. Accordingly, the contactless power transmission device 10 in the first embodiment is capable of following the impedance variation with the preferable manner while suppresses the ground device 11 from being effected by the impedance variation.

(2) It is assumed that the configuration includes the capacitor or the like that converts the impedance. However, the vehicle battery 22 requires the stored amount of the electricity to be larger than that in the cellar phone battery. Accordingly, in order to follow the variation in the impedance when the different power is transmitted, the capacitor having a large capacitance is required. The element as discussed above having the large amount of capacitance is not preferable for a realistic use or may need a lot of costs. In addition, the element as discussed above is likely to have a large size, and therefore, it is concerned that the mounted area be increased.

Contrary, the first embodiment includes the configuration for adjusting the duty ratio that enables the configuration to follow the variation in the impedance. The present invention does not require the elements as discussed above. Accordingly, the first embodiment avoids such a drawback.

(3) The maximum power capable of being supplied to the vehicle battery 22 is used for the first power that is transmitted without passing through the secondary DC/DC converter 31. Accordingly, the first embodiment improves the transmission efficiency when the vehicle battery 22 is charged by the first power. The first embodiment enables the time for charging the vehicle battery 22 to be shortened.

The first embodiment may be modified as discussed below.

Figure 3:
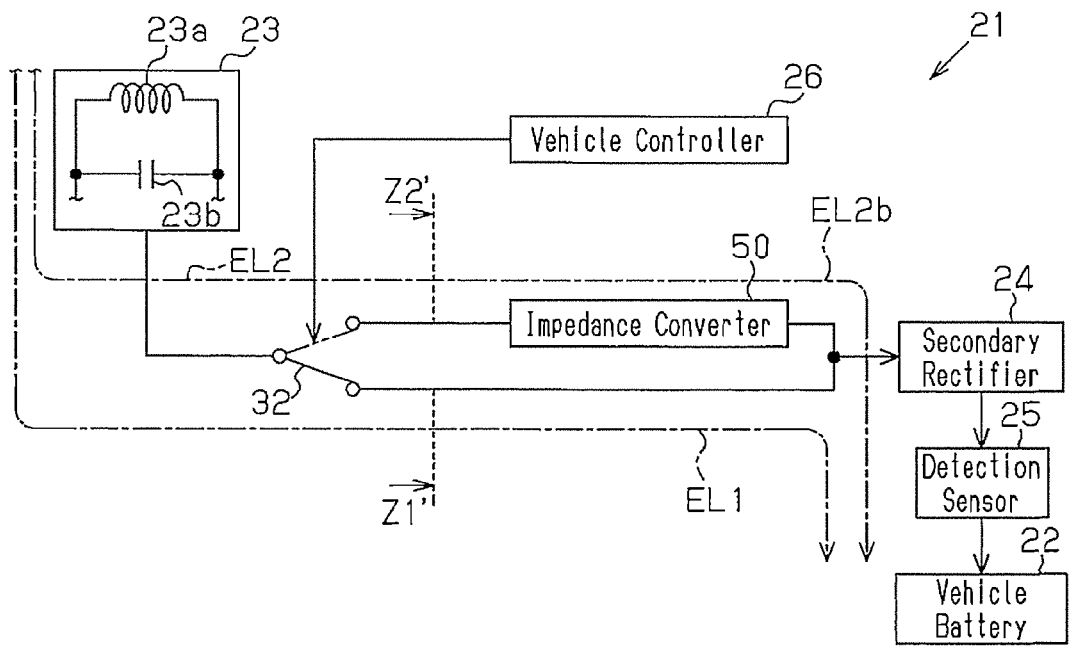
FIG. 3 is a block diagram showing another example of a power transmission line.

In the first embodiment, the individual line EL2a is formed between the secondary rectifier 24 and the detection sensor 25. The secondary DC/DC converter 31 for converting the impedance is arranged on the individual line EL2a. However, the embodiment is not limited to this structure. For example, as shown in FIG. 3, the embodiment may be modified so that an individual line EL2b of the second line EL2 is formed between the power receiver 23 and the secondary rectifier 24. An impedance converter 50 is arranged on the individual line EL2b. In this configuration, the impedance converter 50 approaches a second impedance Z2' from the output end of the relay 32 to the vehicle battery 22 when the second power is transmitted through the second line EL2 to a first impedance Z1' from the output end of the relay 32 to the vehicle battery 22 when the first power is transmitted through the first line EL1. Accordingly, the embodiment in this another example also has an advantageous effect similar to that in the first embodiment. Concrete structure of the impedance converter 50 is, for example, an LC circuit.

The embodiment may be modified so that two lines are arranged between the high-frequency power supply 12 and the power transmitter 13 in the ground device 11. The impedance converter as discussed above is arranged on any one of the two lines. Also this embodiment suppresses the variation in the impedance due to the difference in the transmitted power. However, it is more preferable that the impedance converter 50 is arranged in the vehicle device 21 when focusing on the point that this configuration suppresses the variation in the impedance more preferably.

In the first embodiment, the secondary DC/DC converter 31 is configured to conform the second impedance Z2 to the first impedance Z1. However, the embodiment is not limited to this configuration. In other words, the secondary DC/DC converter 31 only needs to convert the impedance to approach the second impedance Z2 to the first impedance Z1, and do not need to exactly conform the second impedance Z2 to the first impedance Z1.

In the first embodiment, the first power is the maximum power capable of being supplied to the vehicle battery 22. However, the first power is not limited to the maximum power. For example, in the embodiment of another example, the power having high frequency in use may be defined as the first power, or the power supplied for relatively long time may be defined as the first power. In other words, any one of the power having a relatively high frequency in use and the power having a relatively long time to be used only needs to be defined as the first power.

In the first embodiment, the second power is the power that allows the push-in charging. However in the present embodiment, the second power is not limited to the embodiment. For example in the embodiment of another example, the second power may be the power for when a number of the vehicle batteries 22 are charged in parallel in a commercial charging station.

In the first embodiment, the high-frequency power supply 12 is capable of outputting two high-frequency powers that differ to each other in magnitude. However, the present invention is not limited to this configuration. In the embodiment of another example, the number of high-frequency powers that differ to each other may be more than three. In this case, among the powers to be transmitted, the maximum power is transmitted through the first line EL1, and other powers are transmitted through the second line EL2, for example. The vehicle controller 26 adjusts the duty ratio of the switching operation between the first switching element 41 and the second switching element 42 in accordance with the transmitted power.

In a still another example, the embodiment may be modified so that a plurality of lines may be arranged in correspondence with the number of the powers capable of being outputted, and a impedance converter, for example, a DC/DC converter may be arranged in each of the lines in place of the configuration in which the duty ratio is adjusted. In this case, a relay is arranged to switch the line in accordance with the outputted power.

A matching device having a certain impedance may be arranged, for example, between the power receiver 23 and the secondary rectifier 24 on a line common to the first line EL1 and the second line EL2. In this case, even when the power is transmitted to any of the first line EL1 and the second line EL2, the matching device is used for both powers. This simplifies the structure.

In this configuration, it is preferable that the impedance in the matching device be set to correspond to the first impedance Z1. Accordingly, this maintains impedance matching degree at high degree between when the first power is transmitted and when the second power is transmitted.

In the embodiment of still another example, an impedance converter that converts an input impedance of the power transmitter 13 to a certain impedance may be arranged between the high-frequency power supply 12 and the power transmitter 13 in the common line.

In the first embodiment, the high-frequency power supply 12 is a power supply in which the internal resistance is capable of being ignored. However, the embodiment is not limited to this configuration. In the embodiment of another example, the internal resistance may have a certain value, for example, 50Ω. In this case, a matching unit that matches the output impedance of the high-frequency power supply 12 and the input impedance of the power transmitter 13 may be arranged between the high-frequency power supply 12 and the power transmitter 13 in the common line.

The power transmitter 13 may include a primary induction coil that is coupled by an electromagnetic induction to the resonance circuit including the primary coil 13a and the primary capacitor 13b. In this case, the primary induction coil is connected with the high-frequency power supply 12, and the resonance circuit is configured to receive the high-frequency power from the primary induction coil by the electromagnetic induction. Similarly, the power receiver 23 may include a secondary induction coil that is coupled by an electromagnetic induction to the resonance circuit including the secondary coil 23a and the secondary capacitor 23b. In this case, the power is outputted from the resonance circuit of the power receiver 23 by using the secondary induction coil.

The wave profile of the high-frequency power that is outputted from the high-frequency power supply 12 is not limited to the sine wave. The wave profile of the high-frequency power may be a pulse wave, for example.

In the first embodiment, the high-frequency power supply 12 that outputs the high-frequency power is arranged. However, the embodiment is not limited to this configuration. In other words, the power supply only needs to be an AC power supply that outputs an AC power of certain frequency, for example, 10 KHz to 10 MHz. The frequency of the AC power to be outputted may be set in a preferable manner in correspondence with the resonance frequency or the like.

In the first embodiment, the primary capacitor 13b and the secondary capacitor 23b are arranged. However, in the embodiment of another example, these capacitors may be omitted. In this case, the magnetic field resonance is generated between the primary coil 13a and the secondary coil 23a by using a parasitic capacitance of the primary coil 13a and a parasitic capacitance of the secondary coil 23a.

The first embodiment uses the magnetic field resonance to achieve the contactless power transmission. However, the embodiment is not limited to the magnetic resonance, and may use an electromagnetic induction.

In the first embodiment, the vehicle device 21 is mounted on the vehicle. However, the embodiment is not limited to this configuration. In the embodiment of another example, same configuration may be applied to be mounted on other devices such as a cellar phone.

In the first embodiment, the high-frequency power received by the power receiver 23 is used to charge the vehicle battery 22. However, the embodiment is not limited to this configuration. For example, in the embodiment of another example, the high-frequency power may be used to drive other electronic device or the like that is arranged in the vehicle and varies an impedance in accordance with the inputted power.

The first embodiment is configured to adjust the second impedance Z2 by the duty ratio of the switching operation between the first switching element 41 and the second switching element 42. However, the embodiment is not limited to this configuration. For example, the embodiment may be configured so that the cycle of the switching operation between the first switching element 41 and the second switching element 42 is adjusted. In the embodiment, both the duty ratio and the cycle of the switching operation may be adjusted. In other words, the embodiment only needs to adjust at least any one of the duty ratio and the cycle.

An element such as a capacitor that approaches a reactance of the first line EL1 to a reactance of the second line EL2 may be arranged in an individual line in the first line EL1. For example, the element that corresponds to a reactance according to parasitic capacitances, namely input capacitances, of the first switching element 41 and the second switching element 42, may be arranged in series or in parallel with respect to the individual line. Accordingly, this suppresses variation in the reactance, namely an imaginary-part component of the impedance in accordance with the first line EL1 and the second line EL2.

In the first embodiment, the resonance frequency of power transmitter 13 and the resonance frequency of the power receiver 23 are set to be the same to each other. However, the embodiment is not limited to this configuration. The resonance frequency of power transmitter 13 and the resonance frequency of the power receiver 23 may be set to be different to each other within the region capable of transmitting the power.

EXPLANATION OF THE NUMERALS

10 . . . contactless power transmission device, 12 . . . high-frequency power supply, 13a . . . primary coil, 22 . . . vehicle battery, 23a . . . secondary coil, 31 . . . secondary DC/DC converter, 32 . . . relay, EL1 . . . first line, EL2 . . . second line.

The invention claimed is:

1. A contactless power transmission device comprising:
an AC power supply that outputs an AC power;
a primary coil to which the AC power is inputted;
a secondary coil that receives the AC power from the primary coil in a contactless manner; and
a variable load that varies an impedance in accordance with an inputted power,
wherein the AC power supply is configured to output a first AC power and a second AC power that differs in magnitude to each other as the AC power,
wherein a power transmission line between the AC power supply and the variable load includes a first line and a second line different from the first line, and
wherein the contactless power transmission device further comprises:
a switching unit that switches the power transmission line so that a first power is transmitted through the first line when the AC power supply outputs the first AC power and so that a second power is transmitted through the second line when the AC power supply outputs the second AC power; and
an impedance conversion unit arranged on the second line that converts an impedance from an output of the AC power supply to the variable load when the second power is transmitted through the second line to approach an impedance from the output of the AC power supply to the variable load when the first power is transmitted through the first line.

2. The contactless power transmission device according to claim 1, wherein
the impedance conversion unit includes a switching element, and
the impedance conversion unit adjusts at least one of a duty ratio and a cycle of a switching operation of the switching element to convert the impedance.

3. The contactless power transmission device according to claim 1, wherein
the secondary coil and the variable load are mounted on a vehicle,
the contactless power transmission device further comprises a rectifying unit that rectifies the AC power received by the secondary coil to a DC power,
the variable load is a vehicle battery that is charged by receiving the DC power rectified by the rectifying unit.

4. The contactless power transmission device according to claim 3, wherein
the first power is a power that corresponds to a maximum power capable of being supplied to the vehicle battery.

5. The contactless power transmission device according to claim 1, satisfying at least one of conditions as follows:
a frequency of use of the first power is higher than a frequency of use of the second power; and
a time period during which the first power is supplied is relatively longer than a time period during which the second power is supplied.

6. The contactless power transmission device according to claim 1, wherein
the impedance conversion unit is arranged between the secondary coil and the variable load in the second line.

7. The contactless power transmission device according to claim 2, wherein
the contactless power transmission device further comprises a rectifying unit that rectifies the AC power received by the secondary coil to a DC power,
the impedance conversion unit is a DC/DC converter that converts the DC power rectified by the rectifying unit by the switching operation.

* * * * *